United States Patent [19]
Savage et al.

[11] Patent Number: 5,927,996
[45] Date of Patent: Jul. 27, 1999

[54] FLEXIBLE CONNECTOR

[75] Inventors: Mark E. Savage; Walter W. Simpson, both of Albuquerque, N.Mex.

[73] Assignee: Sandia Corporation, Albuquerque, N.Mex.

[21] Appl. No.: 09/004,701

[22] Filed: Jan. 8, 1998

[51] Int. Cl.[6] .................................................. H01R 39/00
[52] U.S. Cl. ..................................... 439/10; 439/1; 439/6
[58] Field of Search ................................. 439/1, 6, 8, 10, 439/33

[56] References Cited

U.S. PATENT DOCUMENTS

| | | | |
|---|---|---|---|
| 3,842,187 | 10/1974 | Barkan | 439/8 |
| 3,843,894 | 10/1974 | Hunt et al. | 439/10 |
| 5,709,553 | 1/1998 | Opfer et al. | 439/6 |

OTHER PUBLICATIONS

AMP Incorporated Catalog, Electrical & Electronic Contacts.

*Primary Examiner*—Paula Bradley
*Assistant Examiner*—Katrina Davis
*Attorney, Agent, or Firm*—V. Gerald Grafe

[57] ABSTRACT

An electrical connector accommodates high current, is not labor intensive to assemble and disassemble, and allows a wide range of motion to accommodate mechanical variations and movement of connected components. The connector comprises several parts with joints therebetween, wherein each joint provides electrical connection between and allows relative motion of the joined parts. The combination of parts and joints maintains electrical connection between two electrical components even if the components are misaligned or move after connection.

19 Claims, 6 Drawing Sheets

5,927,996

FLEXIBLE CONNECTOR

This invention was made with Government support under Contract DE-AC04-94AL85000 awarded by the U. S. Department of Energy. The Government has certain rights in the invention.

BACKGROUND OF THE INVENTION

This invention relates to the field of electrical connectors, specifically connectors having multiple degrees of freedom and suitable for use with high currents.

High current connections are often made with bolted or welded connections. Such rigid connections can be difficult to disassemble, and have no tolerance to mechanical variations. Disassembly can be required for service or replacement of system components. Mechanical variations can arise from manufacturing tolerances, thermal expansion and contraction, and component shifting.

Presently, a variety of connectors are used for high current connections. These include "crushable current gasket" connectors, flexible metal braid connections, and "spherical slide" connectors.

A crushable current gasket connector uses metal tubing in a groove. The tubing is crushed and compressed during assembly. The resulting connection accommodates some mechanical variations, but only those present before assembly. Also, a new metal tube must be used every time the joint is assembled.

Multiple pieces of flexible metal braid have also been used as flexible high current connections. The resulting connection can be flexible. The magnetic field associated with high current squeezes each braid and forces the braids away from the return cable. Repeated squeezing and repeated component motion can fatigue the braid and lead to failure. Also, flexible braid connections can be labor-intensive to assemble and disassemble since each piece of braid must be individually attached.

A spherical slide connector is currently available for high current connections, and does accommodate some component misalignment. The spherical slide connector has a very limited angular range, however, where angular displacement reduces the contact area. Also, the spherical slide connector can not accommodate lateral translation between the parts to be connected.

Other high current connections are available, but none combine ease of disassembly with high current capability, and none allow for general motion by the system components. Accordingly, there is a need for a connector that can accommodate high current, is not labor intensive to assemble and disassemble, and that allows a wide range of motion to accommodate mechanical variations and component movement.

SUMMARY OF THE INVENTION

The present invention provides a connector that can accommodate high current, is not labor intensive to assemble and disassemble, and that allows a wide range of motion to accommodate mechanical variations and component movement. The present invention comprises several parts with joints therebetween, wherein each joint provides electrical connection between and allows relative motion of the joined parts. The combination of parts and joints maintains electrical connection between two electrical components even if the components are misaligned or move after connection.

The connector can comprise fours parts defining four joints therebetween. A first joint can provide a slidable connection in a first plane, accommodating relative translation and rotation in the first plane. A second joint can provide a slidable connection in a second plane, substantially orthogonal to the first plane, accommodating relative translation and rotation in the second plane. The two orthogonal planes combine to accommodate general translation of the joined components and relative rotation except about the common axis of the two planes. A third joint can provide a slidable cylindrical connection, wherein the cylindrical connection axis is substantially parallel to the common axis of the two planes, allowing translation along and rotation about the axis of the cylindrical connection.

Advantages and novel features will become apparent to those skilled in the art upon examination of the following description or may be learned by practice of the invention. The objects and advantages of the invention may be realized and attained by means of the instrumentalities and combinations particularly pointed out in the appended claims.

DESCRIPTION OF THE FIGURES

The accompanying drawings, which are incorporated into and form part of the specification, illustrate embodiments of the invention and, together with the description, serve to explain the principles of the invention.

DETAILED DESCRIPTION OF THE INVENTION

The present invention provides a connector that can accommodate high current, is not labor intensive to assemble and disassemble, and that allows a wide range of motion to accommodate mechanical variations and component movement. The present invention comprises several parts with joints therebetween, wherein each joint provides electrical connection between and allows relative motion of the joined parts. The combination of parts and joints maintains electrical connection between two electrical components even if the components are misaligned or move after connection.

Figure 1:
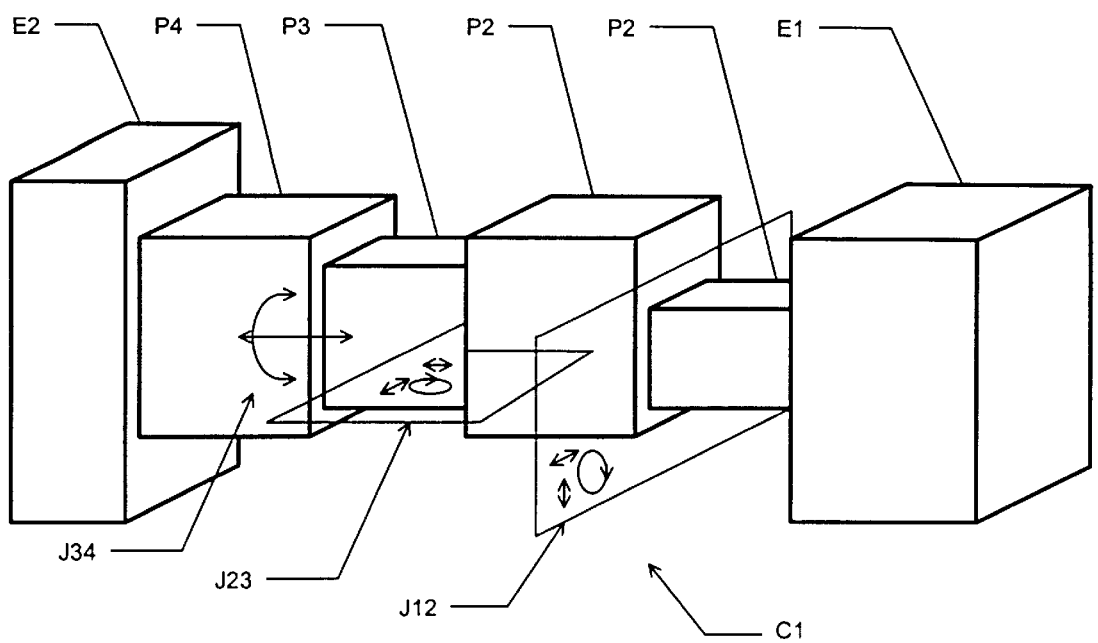
FIG. 1 is an illustration of a connector according to the present invention.

FIG. 1 is an illustration of a connector C1 according to the present invention. The connector C1 comprises parts P1, P2, P3, P4 implementing joints J12, J23, J34 therebetween. Connector C1 connects two electrical components E1, E2.

A first end P1$a$ of a first part P1 is adapted to provide electrical connection to the first electrical component E1. A second end P1$b$ of the first part P1 and a first end P2$a$ of a second part P2 are adapted to provide electrical connection between parts P1, P2. The two ends are further adapted to maintain electrical connection while allowing the parts P1, P2 to move relative to each other in a first plane J12.

A second end P2$b$ of the second part P2 and a first end P3$a$ of the third part P3 are adapted to provide electrical connection between parts P2, P3. The two ends are further adapted to maintain electrical connection while allowing the parts P2, P3 to move relative to each other in a second plane J23.

A second end P3$b$ of the third part and a first end P4$a$ of the fourth part P4 are adapted to provide electrical connection between parts P3, P4. The two ends are further adapted to maintain electrical connection while allowing parts P3, P4 to translate relative to each other along and rotate relative to each other about an axis, as illustrated by arrows J34.

A second end P4b of the fourth part P4 is adapted to provide electrical connection to a second electrical component E2.

The combination of motion in the first plane J12, motion in the second plane J23, and motion along and about an axis J34 allows connector C1 to maintain electrical connection between electrical components E1, E2. Connector C1 maintains electrical connection even if manufacturing or assembly tolerances have caused electrical components E1, E2 to be misaligned. Connector C1 also maintains electrical connection even if electrical components E1, E2 have shifted position relative to each other. Connector C1 also maintains electrical connection even if electrical components E1, E2 move relative to each other during operation due to, for example, vibration.

Figure 2:
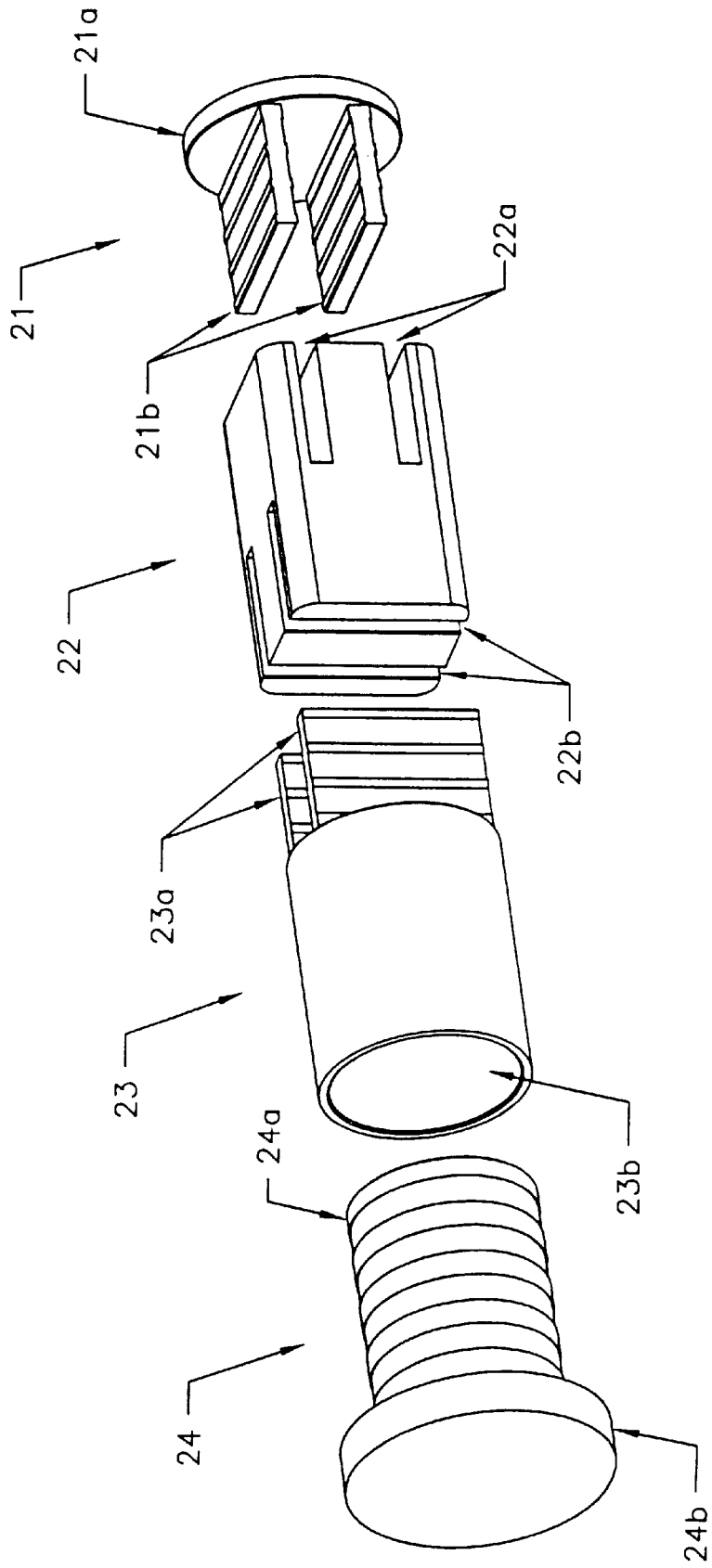
FIG. 2 is a view of a disassembled connector according to the present invention.

FIG. 2 is a view of a disassembled connector C2 according to the present invention. Four parts 21, 22, 23, 24 provide electrical connection between two electrical components (not shown), A first part 21 has a first end 21a adapted to provide electrical connection to an electrical component (not shown). A second end of first part 21 comprises one or more substantially parallel blades 21b (two in the figure). A first end of second part 22 comprises a number of substantially parallel slots 22a corresponding to the number of substantially parallel blades 21b. Slots 22a can be sized to allow blades 21b to slide into slots 22a and to move relative to slots 22a (rotation or translation in the plane defined by the slot-blade surfaces) while still maintaining electrical contact. For example, slots 22a and blades 21b can be substantially the same width so that a friction fit is achieved, or compliant material can be mounted with either or both to maintain electrical contact while allowing relative motion.

A second end of the second part 22 can also comprise substantially parallel slots 22b, corresponding to one or more substantially parallel blades 23a (two in the figure) formed on a first end of a third part 23. Slots 22b and blades 23a can be sized as discussed for slots 22a and blades 21b, allowing rotation or translation in the plane defined by the slot-blade surfaces. Slots 22a and slots 22b can be in orthogonal planes so that their combination allows relative motion between first part 21 and third part 23 in multiple degrees of freedom.

A second end of third part 23 can comprise a hollow cylindrical section 23b. A first end of fourth part 24 can have a cylindrical outer cross-section 24a, corresponding to hollow cylindrical section 23b in a similar manner as discussed for slots and blades above. Sliding contact between hollow cylindrical section 23b and cylindrical outer cross section 24a allows longitudinal motion of fourth part 24 relative to third part 23 along the axis of hollow cylindrical section 23b and rotation of fourth part 24 relative to third part 23 about the same axis.

A second end of fourth part 24 is adapted to provide electrical connection to an electrical component (not shown).

Planar motion from the two sets of slots and blades combined with axial and rotation motion from the cylindrical section provides an electrical connector that accommodates motion or misalignment between two electrical components along or about any axis.

FIGS. 3(a–d) shows a connector according to the present invention. FIG. 3a shows a part 310 analagous to part 21 of FIG. 2. Two substantially parallel blades 311 mount with an end 312 adapted to connect with an electrical component (not shown). In a prototype connector, each blade 311 was 0.480 inch thick, 4.0 inch wide, and extended 3.0 inch from the rest of the part 310. The surface of each blade can have one or more (three in the figure) grooves 313 milled therein, or other means adapted to allow mounting a compliant connection material such as Multicontact™. A prototype connector had dovetail shaped grooves 0.650 inch wide, tapering at 45° to a depth of 0.030 inch, and extending across the width of each surface of each blade, allowing insertion of Multicontact™ type LA-1, 0.3 mm thickness, part number LA-1/0.30 (not shown), described in the "Electrical and Electronic Contacts" catalog from AMP Incorporated, incorporated herein by reference. Alternatively, the surfaces of blades 311 can be formed to achieve a slidable electrical connection with the surfaces of substantially parallel slots 321 in the part 320 shown in FIG. 3b.

Figure 3A:
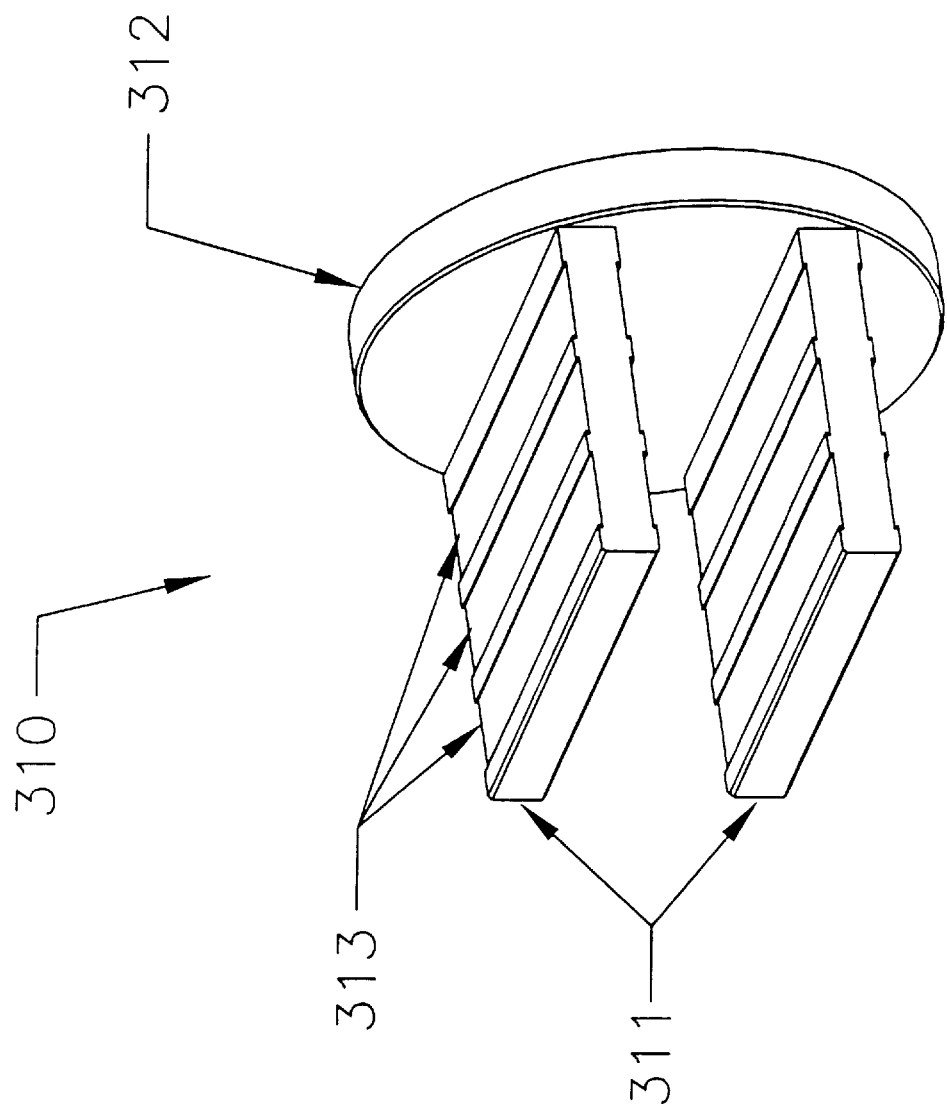
FIGS. 3(a–d) are views of a connector according to the present invention.
Figure 3B:
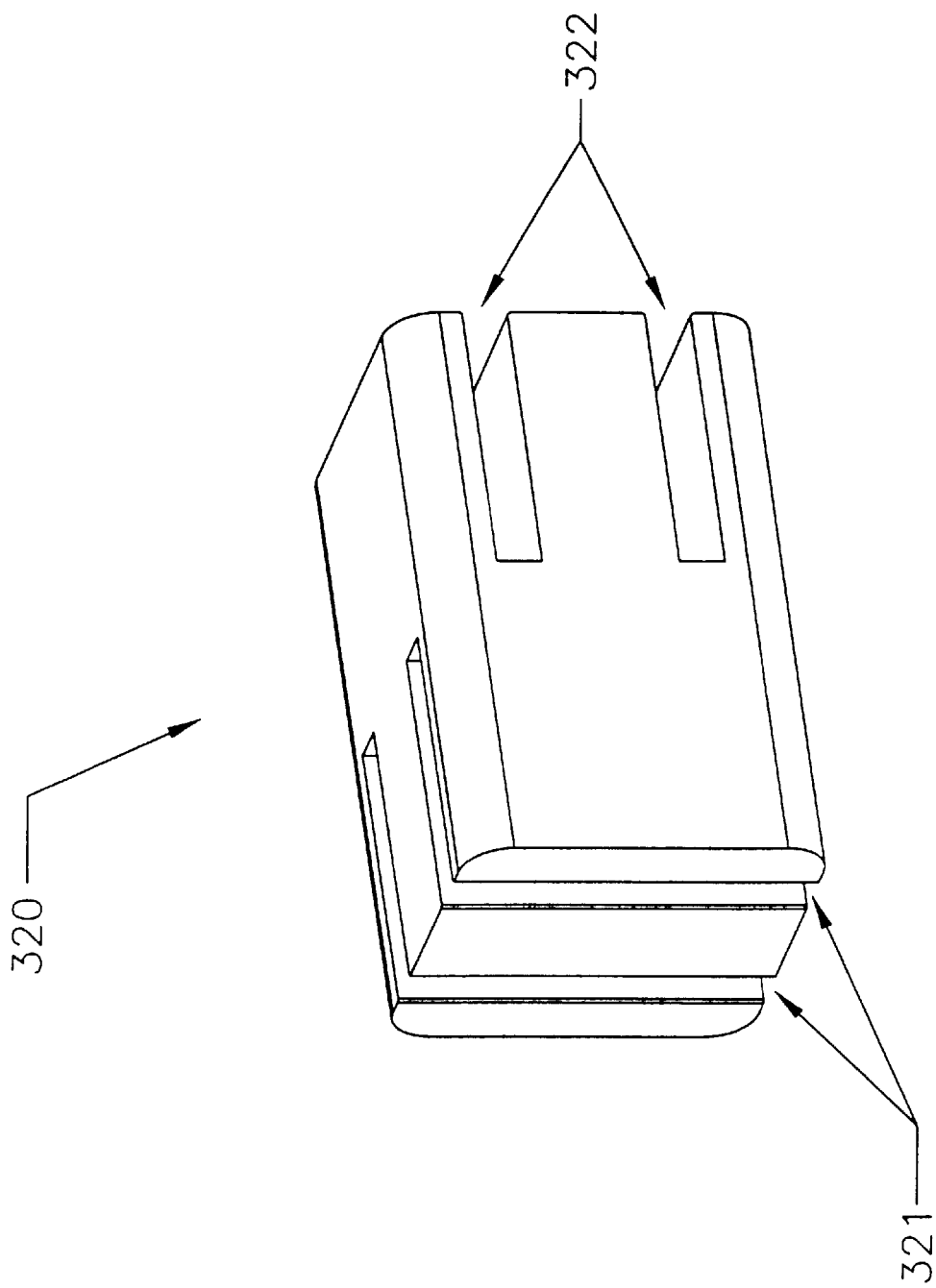

FIG. 3b shows a part 320 analogous to part 22 of FIG. 2. Slots 321, 322 are formed in each of two ends of part 320. A first set of slots 321 (two in the figure) are orthogonal to a second set of substantially parallel slots 322 (two in the figure) to allow a full range of motion in the completed connector. Slots 321, 322 can be sized as discussed in FIG. 2. Slots 321, 322 can extend across the width of part 320. For example, with the blade dimensions, grooves, and Multicontact™ material discussed for the prototype connector in FIG. 3a, slots 321 can be 0.050 inch across, 4.0 inch wide, and extend 3.0 inch into the rest of the part 320. Grooves (not shown) can be formed in the surfaces of slots 321, 322 and compliant material mounted with slots 321, 322 rather than blades 311 in FIG. 3a. As another alternative, mating compliant material (not shown) can be mounted with the surfaces of blades 311 and slots 321, 322, or appropriate surface treatments or finishes can be applied thereto.

Figure 3C:
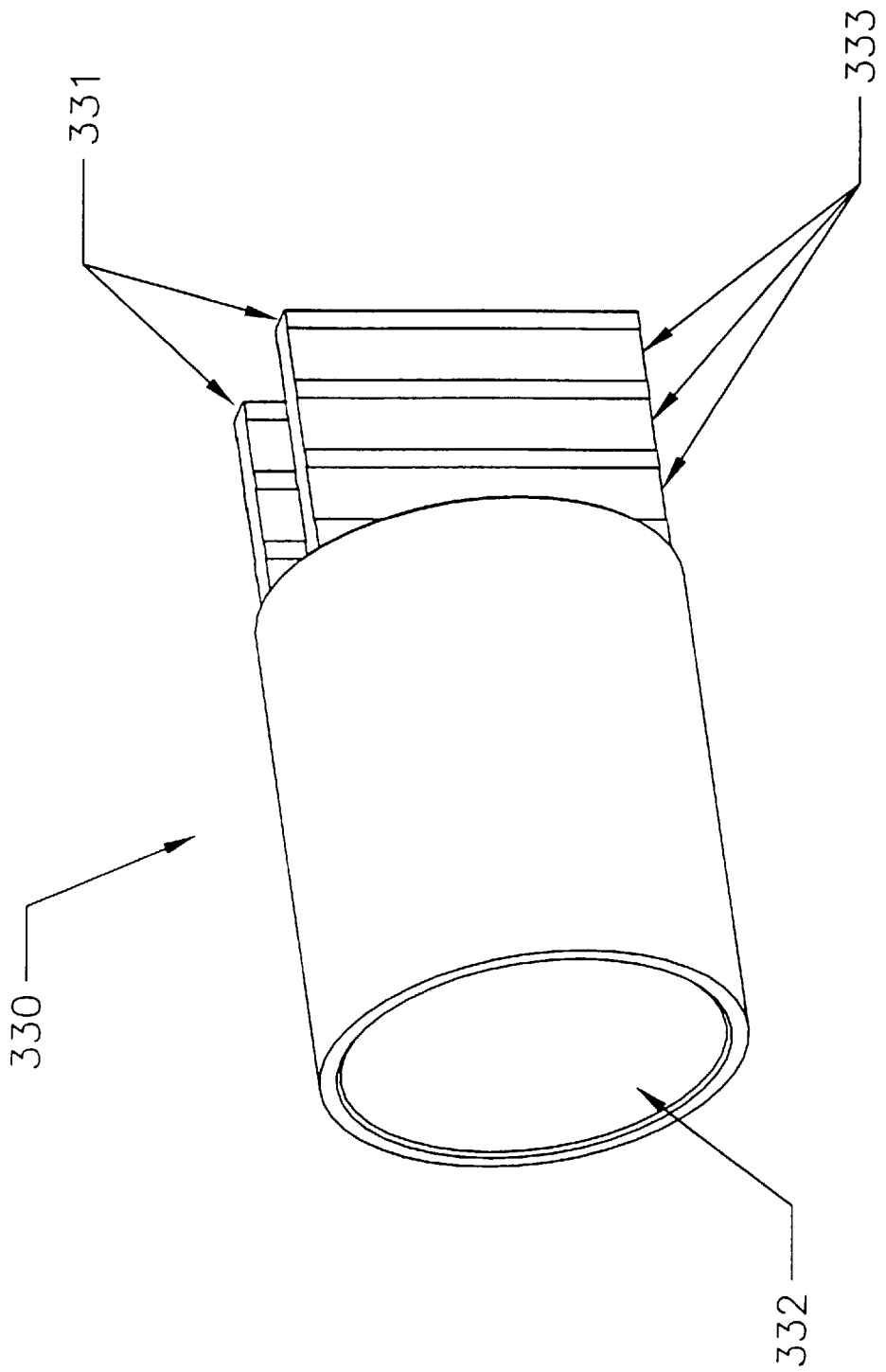

FIG. 3c shows a part 330 analogous to part 23 of FIG. 2. A set of substantially parallel blades 331 (two in the figure) mount with a first end of part 330. Blades 331 can be sized as discussed for FIG. 3a. Blades 331 can have grooves 333 formed therein to mount compliant material (not shown) or have surface treatment or finish as discussed in FIG. 3a and FIG. 3b. A second end of the part 330 in FIG. 3c comprises a hollow section 332 having a hollow cylindrical interior cross section. The interior surface of hollow section 332 can be smooth, can have grooves (not shown) or other means for mounting a compliant material such as Multicontact™, or can have surface treatment or finish to achieve a slidable electrical connection with the part 340 shown in FIG. 3d.

Figure 3D:
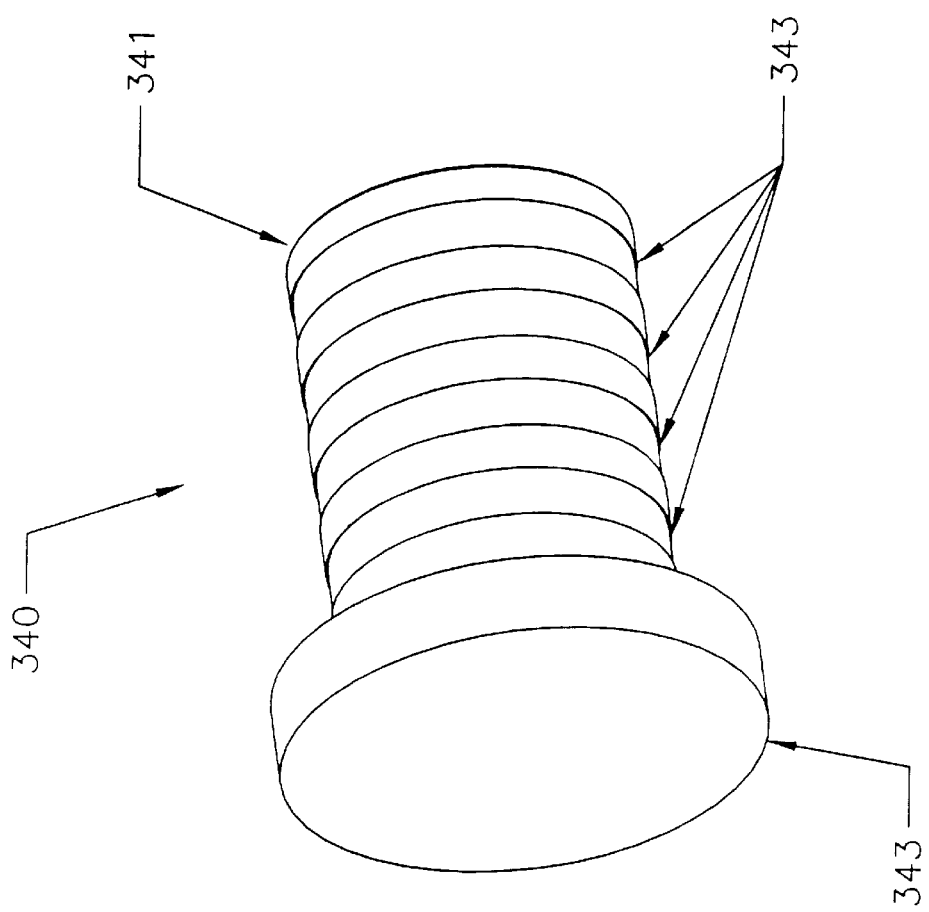

FIG. 3d shows a part 340 analogous to part 24 of FIG. 2. A cylindrical end 341 of part 340 has a cylindrical outer cross section, sized to correspond to the hollow section 332 in FIG. 3c. The outer surface of cylindrical end 341 can have grooves 343 or other means for mounting a compliant material such as Multicontact™, can be smooth to mate with compliant material mounted with hollow section 332, or can have surface treatment or finish to achieve a slidable electrical contact with the interior surface of hollow section 332. A prototype connector had a hollow section 332 approximately 4.270 inch in inner diameter and cylindrical end 341 approximately 4.250 inch in outer diameter. One or more grooves 343 (four in the figure) can be formed into the outer surface of cylindrical end 341. Four dovetail shaped grooves 0.650 inch wide, tapering at 45° to a depth of 0.030 inch and extending around the circumference of cylindrical end 341 allowed mounting of Multicontact™ type LA-1, 0.3 mm thickness, part number LA-1/0.30 (not shown) in a prototype connector. A second end 343 of the part in FIG. 3d is adapted to make electrical connection with an electrical component (not shown).

If the contacts between parts have large area contact not in an azimuthal line, then the several parts can be made from material that has high enough resistivity to allow current penetration on the timescale of the current pulse of interest. In general, any material from the innermost contact surface to the outside of the connector should have a skin depth, for pulses of interest and the material's resistivity, greater than the distance from the innermost contact surface to the outside of the connector. Longer pulses are more stressful on a given amount of contact area, so the connector can automatically use more joint area for longer pulses. A connector according to the present invention made from stainless steel, with 0.6 cm walls surrounding hollow section 332 and 1.0 cm from slots 321, 322 to the corresponding side of part 320, can distribute 500 microsecond current pulses substantially uniformly over several layers of contact material. A prototype connector, made from stainless steel with the dimensions given for FIGS. 3(*a–d*), passed peak currents of nearly 500 kA, with an action integral of $\int I^2 dt = 80 \cdot 10^6 A^2 \cdot sec$.

Connectors according to the present invention made from higher resistivity materials can accommodate shorter current pulses. For example, titanium and inconel (an alloy of iron, nickel, and chromium; Inconel 718, with 53% Ni, 19% Fe, 19% Cr, and traces of Nb, Mo, and Ti, has high resistivity) are hard enough to work well with Multicontact™ and have higher resistivity than stainless steel. Stainless steel has adequate resistivity for 60 Hz power connections.

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

We claim:

1. An electrical connector for connecting first and second electrical components, comprising:
   a) a first part having first and second ends, wherein the first end is adapted to provide electrical connection with the first electrical component;
   b) a second part having first and second ends, wherein the first end of the second part and the second end of the first part are adapted to provide electrical connection therebetween and to move relative to each other in a first plane;
   c) a third part having first and second ends, wherein the first end of the third part and the second end of the second part are adapted to provide electrical connection therebetween and to move relative to each other in a second plane, wherein the second plane is substantially orthogonal to the first plane; and
   d) a fourth part having first and second ends, wherein the second end is adapted to provide electrical connection to the second component, and wherein the first end of the fourth part and the second end of the third part are adapted to provide electrical connection therebetween and to translate longitudinally relative to each other along an axis and to rotate relative to each other about the axis.

2. The connector of claim 1, wherein:
   a) the first end of the second part comprises at least one blade, wherein said blades are substantially parallel with each other, and wherein the second end of the first part comprises a corresponding number of slots adapted to slidably receive said blade;
   b) the first end of the third part comprises at least one blade, wherein said blades are substantially parallel with each other, and wherein the second end of the second part comprises a corresponding number of slots adapted to slidably receive said blade; and
   c) the second end of the third part comprises a cylinder section having a cylindrical outer cross section, and wherein the first end of the fourth part comprises a hollow section having a cylindrical hollow portion adapted to slidably receive said cylinder section.

3. The connector of claim 1, wherein the first end of the second part comprises at least one blade, wherein said blades are substantially parallel with each other, and wherein the second end of the first part comprises a corresponding number of slots adapted to slidably receive said blade.

4. The connector of claim 3, wherein the first end of the second part further comprises a compliant electrical contact material mounted with at least one of the facing surfaces of said blades and said slots.

5. The connector of claim 1, wherein the second end of the first part comprises at least one blade, wherein said blades are substantially parallel with each other, and wherein the first end of the second part comprises a corresponding number of slots adapted to slidably receive said blade.

6. The connector of claim 5, wherein the first end of the second part further comprises a compliant electrical contact material mounted with at least one of the facing surfaces of said blades and said slots.

7. The connector of claim 1, wherein the first end of the third part comprises at least one blade, wherein said blades are substantially parallel with each other, and wherein the second end of the second part comprises a corresponding number of slots adapted to slidably receive said blade.

8. The connector of claim 7, wherein the first end of the third part further comprises a compliant electrical contact material mounted with at least one of the facing surfaces of said blades and said slots.

9. The connector of claim 1, wherein the second end of the second part comprises at least one blade, wherein said blades are substantially parallel with each other, and wherein the first end of the third part comprises a corresponding number of slots adapted to slidably receive said blade.

10. The connector of claim 9, wherein the first end of the third part further comprises a compliant electrical contact material mounted with at least one of the facing surfaces of said blades and said slots.

11. The connector of claim 1, wherein the second end of the third part comprises a cylinder section having a cylindrical outer cross section, and wherein the first end of the fourth part comprises a hollow section having a cylindrical hollow portion adapted to slidably receive said cylinder section.

12. The connector of claim 11, wherein the first end of the fourth part further comprises a compliant electrical contact material mounted with at least one of the inner surface of said hollow section and the outer surface of said cylinder section.

13. The connector of claim 1, wherein the first end of the fourth part comprises a cylinder section having a cylindrical outer cross section, and wherein the second end of the third part comprises a hollow section having a cylindrical hollow portion adapted to slidably receive said cylinder section.

14. The connector of claim 13, wherein the second end of the third part further comprises a compliant electrical contact material mounted with at least one of the inner surface of said hollow section and the outer surface of said cylinder section.

15. The connector of claim 1, wherein:
   a) the second end of the first part comprises at least one blade, wherein said blades are substantially parallel with each other, and wherein the first end of the second part comprises a corresponding number of slots adapted to slidably receive said blade;

b) the first end of the third part comprises at least one blade, wherein said blades are substantially parallel with each other, and wherein the second end of the second part comprises a corresponding number of slots adapted to slidably receive said blade; and c) the first end of the fourth part comprises a cylinder section having a cylindrical outer cross section, and wherein the second end of the third part comprises a hollow section having a cylindrical hollow portion adapted to slidably receive said cylinder section.

16. The connector of claim 15, further comprising a compliant contact material mounted with at least one surface of each blade and mounted with the outer surface of said cylinder section.

17. An electrical connector for connecting first and second electrical components, comprising:

a) a first part having first and second ends, wherein the first end is adapted to provide electrical connection with the first electrical component, and wherein the second end comprises at least one blade, wherein said blades are substantially parallel with each other;

b) a fourth part having first and second ends, wherein the second end is adapted to provide electrical connection to the second electrical component, and wherein the first end comprises a cylinder section having a cylindrical outer cross section;

c) a third part having first and second ends, wherein the second end comprises a hollow section having a cylindrical hollow portion corresponding to and adapted to slidably receive the cylinder section of the fourth part, and wherein the first end comprises at least one blade, wherein said blades are substantially parallel with each other; and d) a second part having first and second ends, wherein the first end of the second part comprises slots corresponding to and adapted to slidably receive the blades of the first part, and wherein the second end comprises slots corresponding to and adapted to slidably receive the blades of the third part.

18. The connector of claim 17, further comprising a compliant contact material mounted with at least one surface of each blade and mounted with the outer surface of said cylinder section.

19. The connector of claim 17, wherein the first, second, third, and fourth parts of made of stainless steel, and wherein each blade is substantially 0.48 inch thick, and wherein said cylinder section is substantially 4.25 inch in outer diameter.

* * * * *